E. M. STOFFELS.
CINEMATOGRAPHIC DEVICE.
APPLICATION FILED MAY 22, 1914.
1,231,961.
Patented July 3, 1917.
10 SHEETS—SHEET 2.
Fig. 3.
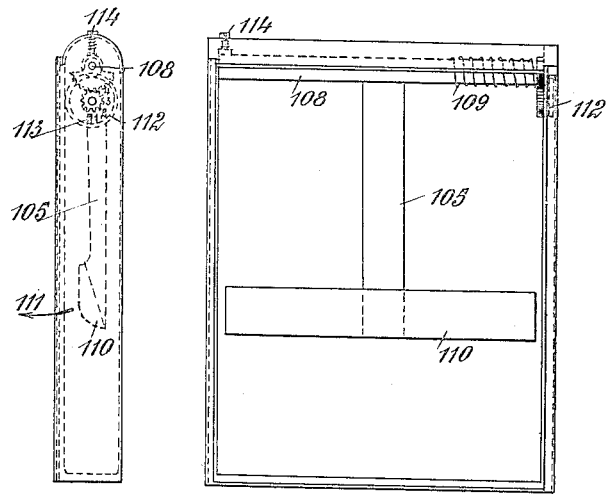
Fig. 8 (Y-Y)
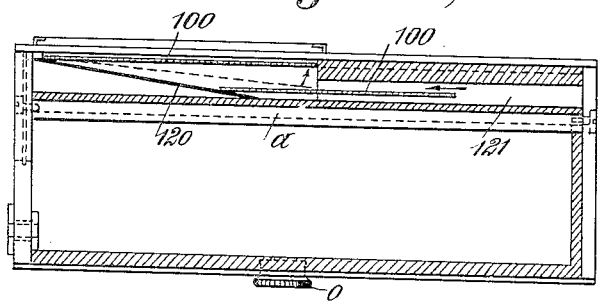
Fig. 9 (X-X)
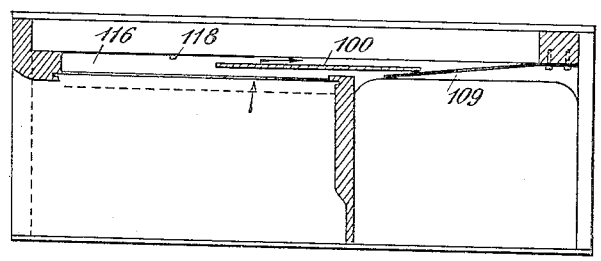
WITNESSES
Cornelius Hoving
John H. Hoving
INVENTOR
E. M. STOFFELS
BY H. van Oldeneel
ATTORNEY

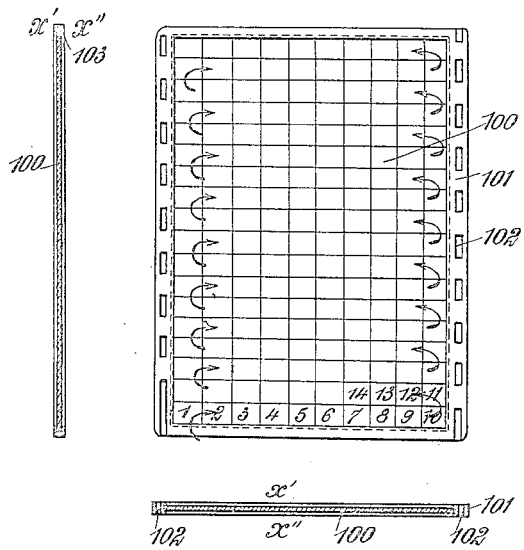
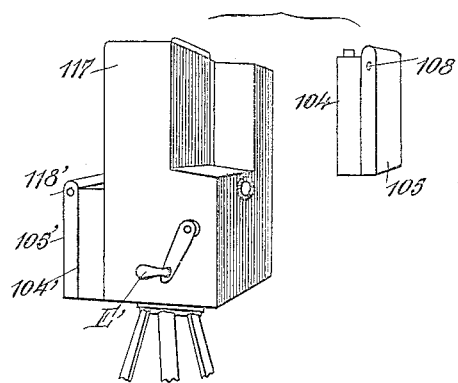
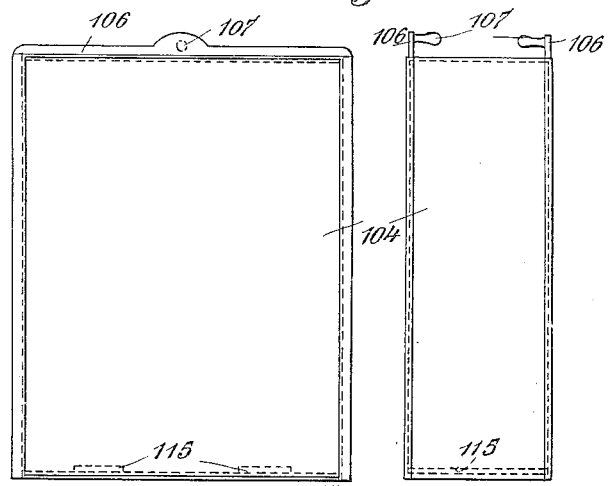
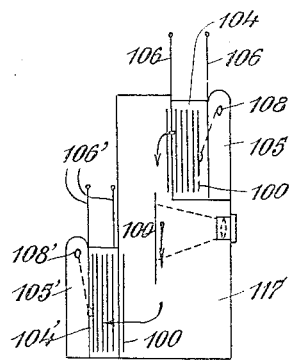
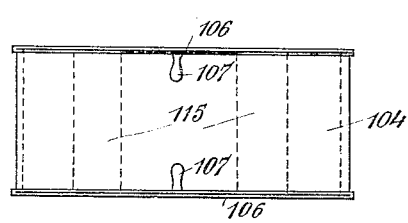

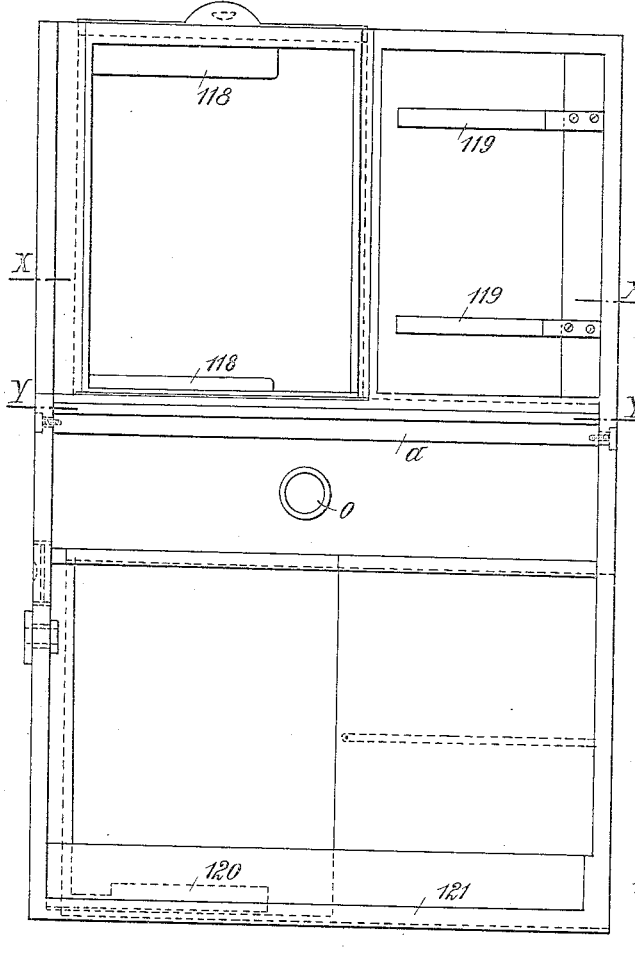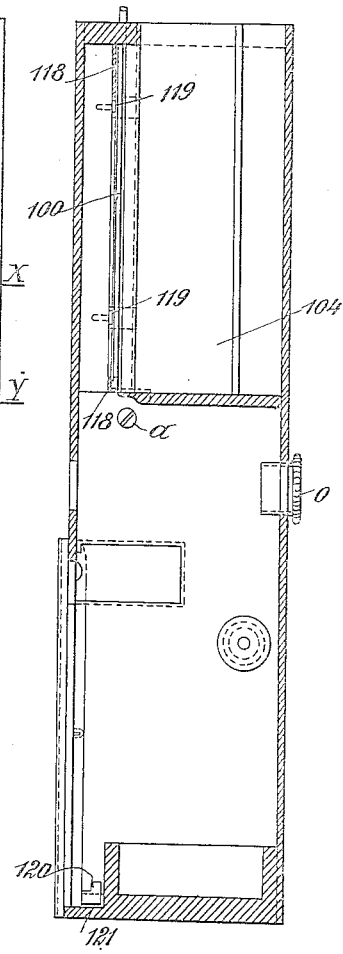

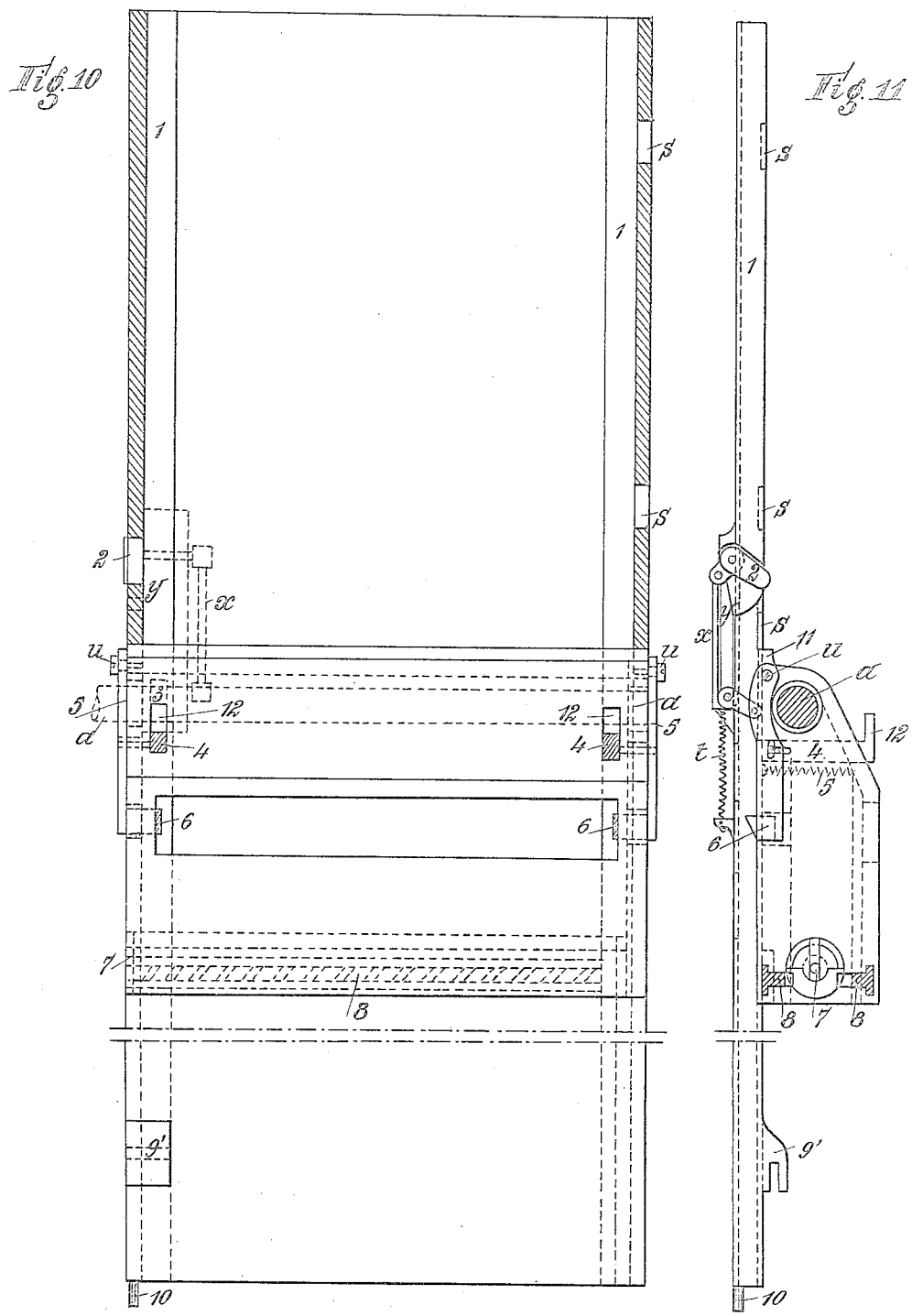

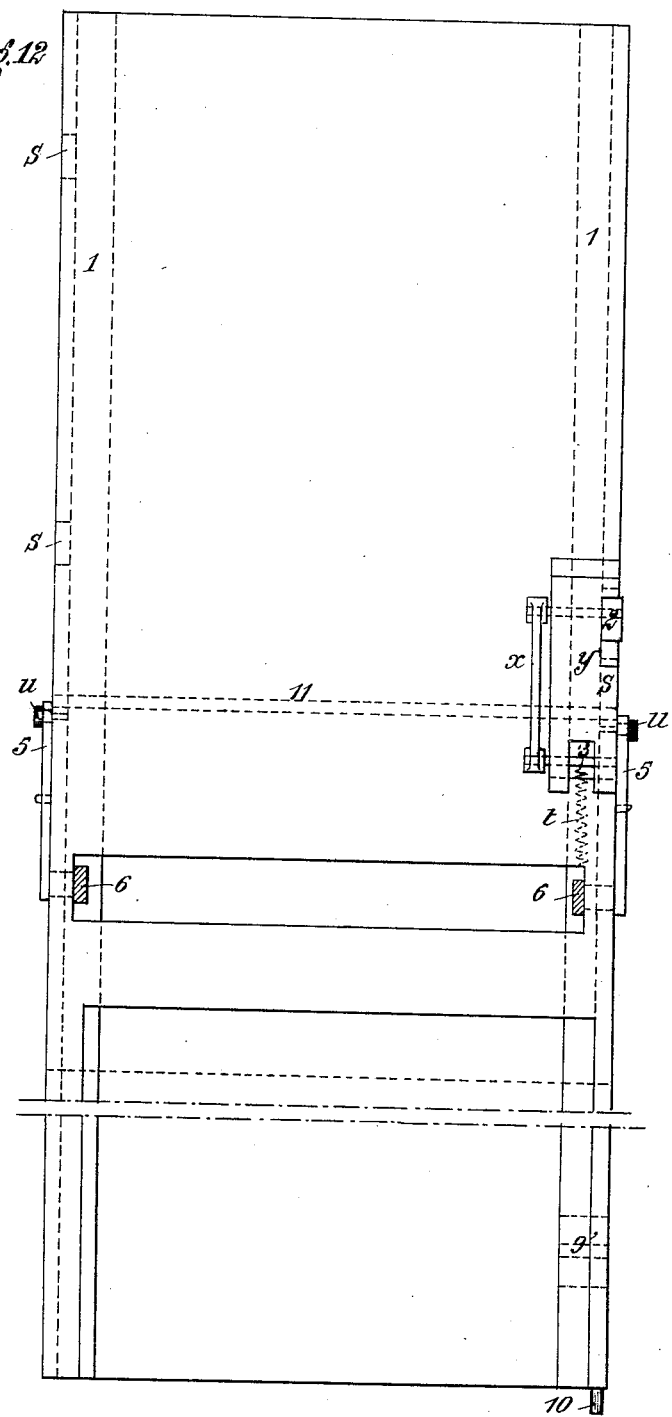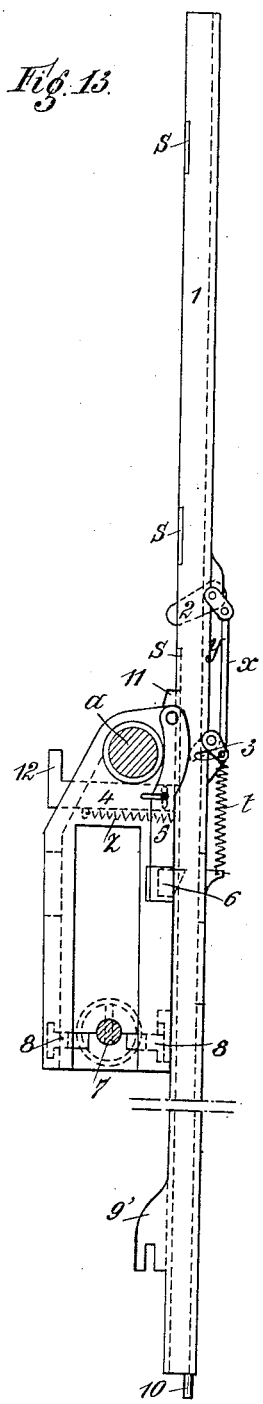

E. M. STOFFELS.
CINEMATOGRAPHIC DEVICE.
APPLICATION FILED MAY 22, 1914.
1,231,961.
Patented July 3, 1917.
10 SHEETS—SHEET 6.
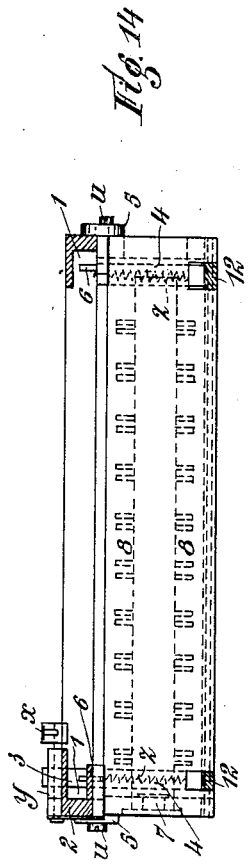
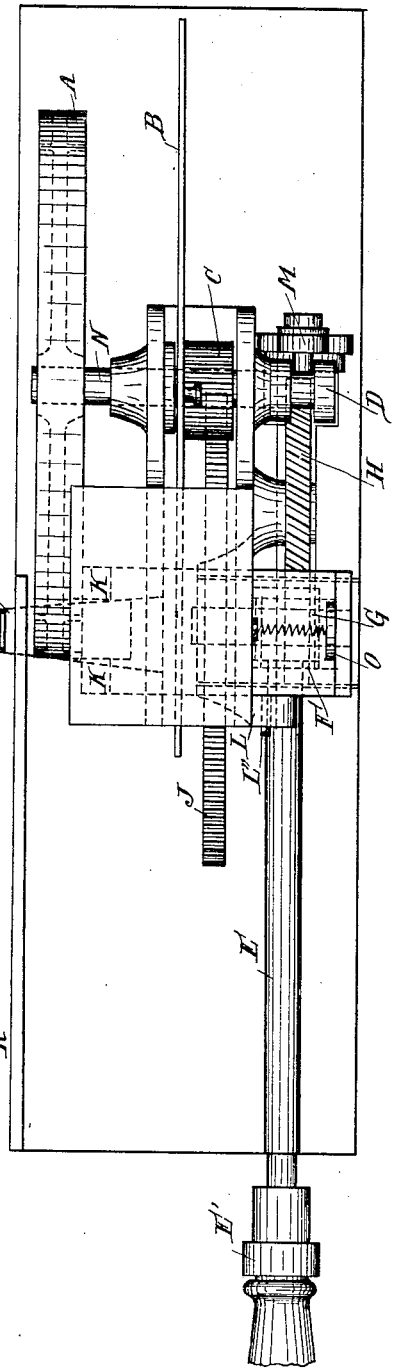
WITNESSES
INVENTOR
E. M. STOFFELS
ATTORNEY

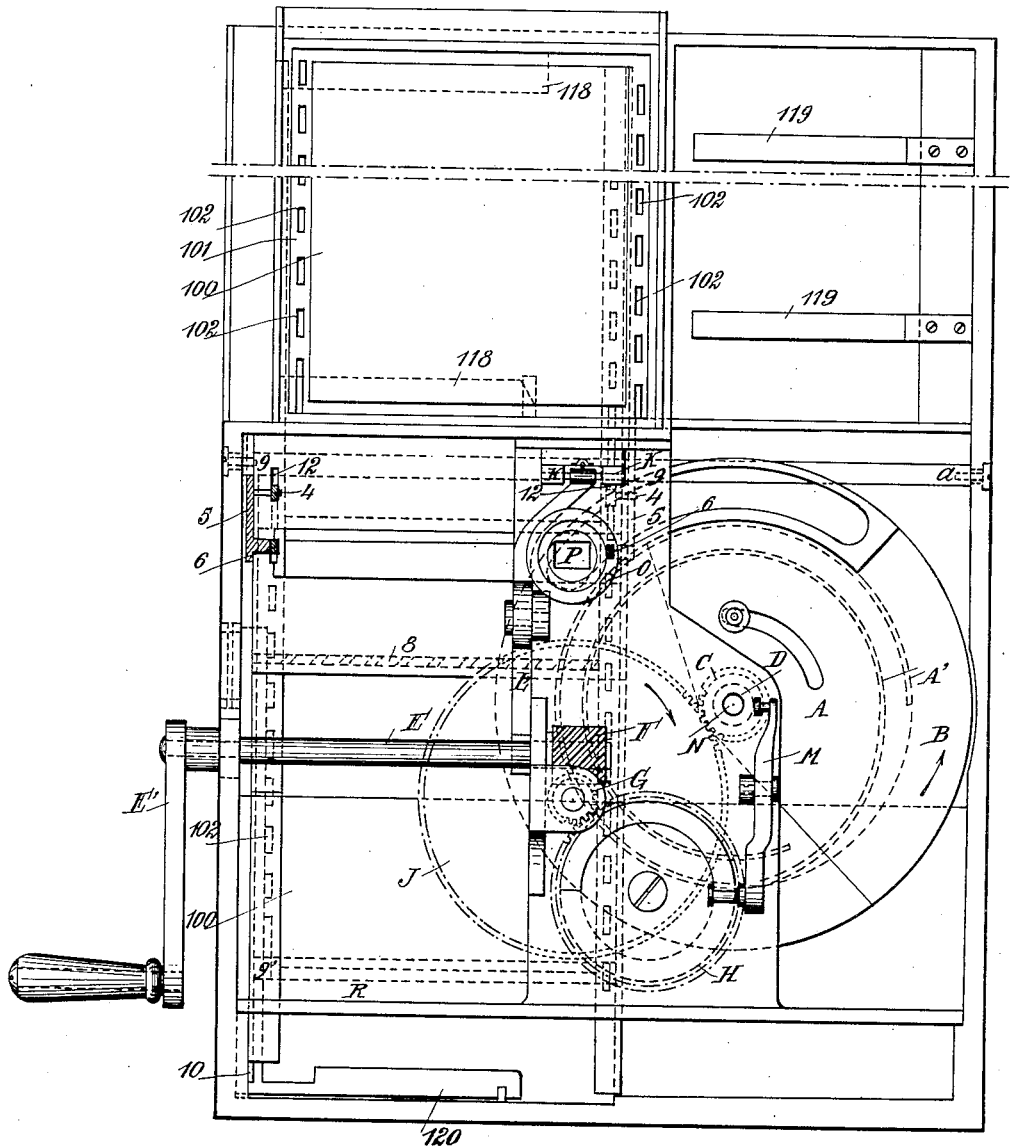

E. M. STOFFELS.
CINEMATOGRAPHIC DEVICE.
APPLICATION FILED MAY 22, 1914.

1,231,961.

Patented July 3, 1917.
10 SHEETS—SHEET 8.

WITNESSES
Cornelius Hoving.
John H. Hoving

INVENTOR
E. M. STOFFELS
By H. Van Oudenwal
ATTORNEY

E. M. STOFFELS.
CINEMATOGRAPHIC DEVICE.
APPLICATION FILED MAY 22, 1914.

1,231,961.

Patented July 3, 1917.
10 SHEETS—SHEET 9.

WITNESSES
Cornelius Hoving
John H. Hoving

INVENTOR
E. M. STOFFELS
BY H. Van Oldenneel
ATTORNEY

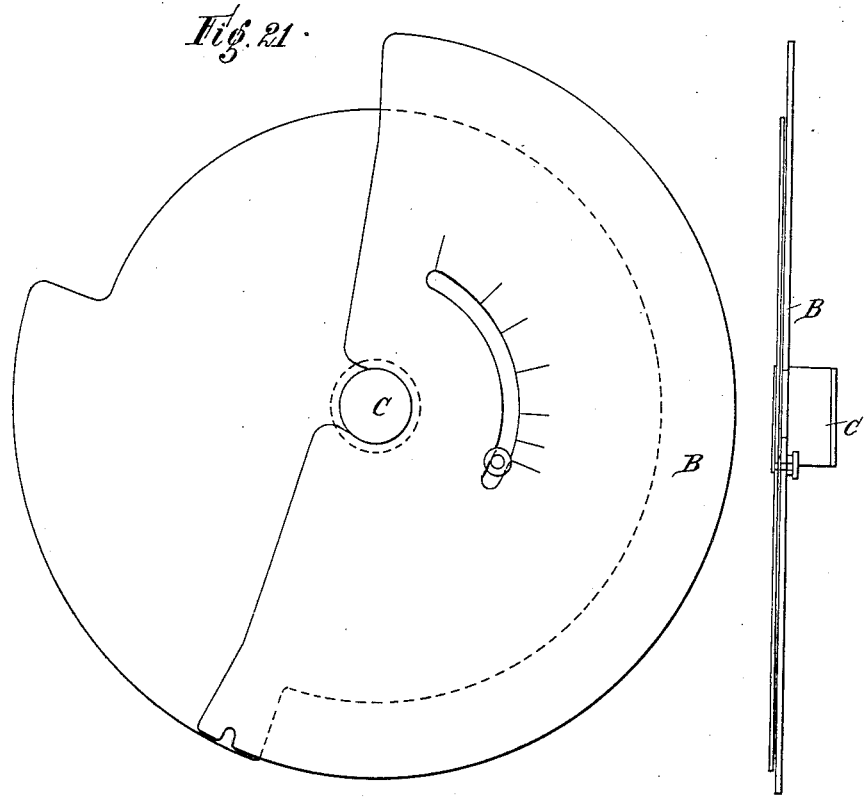
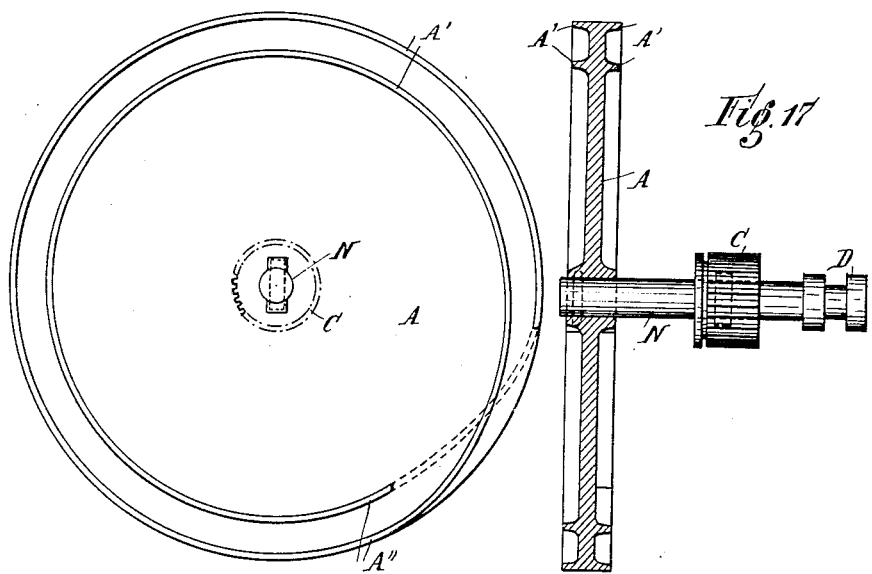

UNITED STATES PATENT OFFICE.

EMILE M. STOFFELS, OF CONTICH, BELGIUM.

CINEMATOGRAPHIC DEVICE.

1,231,961.　　　　Specification of Letters Patent.　　Patented July 3, 1917.

Application filed May 22, 1914. Serial No. 840,198.

*To all whom it may concern:*

Be it known that I, EMILE M. STOFFELS, a subject of the King of the Belgians, and residing at Contich, Belgium, have invented certain new and useful Improvements in Cinematographic Devices, of which the following is a specification.

My present invention relates to a new cinematographic apparatus for making and projecting photographs by means of photographic plates, and has for its object to provide an apparatus of this kind, wherein the photographic plates are pushed by a registering spring device from the plate containing box into a horizontal guide-groove, in which the forwardly pushed plate is moved horizontally by a movable frame reciprocated in front of the objective until it is received in vertical grooves of said frame and held by the latter in such a way, that after each horizontal stroke of the frame the plate will be lowered to the height of a horizontal row of pictures, whereupon the plate is moved together with the frame in opposite direction in front of the objective, in order to make or project a new series of pictures, this operation being repeated until the entire surface has been reciprocated in front of the objective, when the plate lowered upon the bottom of the apparatus is released from the frame and pushed in a direction at right angles to its plane into a second plate storing box, which in all respects is similar to the first named plate-box.

In the accompanying drawings I have illustrated by way of example a form of construction of my invention; in these drawings:

Figure 1 shows the front view and vertical and horizontal sections of a plate carrying frame carrying a photographic plate;

Fig. 2 shows the front, side and top plan view of a plate containing box;

Fig. 3 shows similar views of the plate feeding and counting device, associated with the plate containing box;

Fig. 4 is a diagrammatic perspective view of the apparatus with the feed-box removed;

Fig. 5 is a vertical section through the same, showing diagrammatically the way through which the plates are moved from the upper plate-box to the lower plate-box;

Fig. 6 shows an inner view of the casing of the apparatus;

Fig. 7 is a vertical sectional view of same;

Fig. 8 is a horizontal section on line Y—Y of Fig. 6;

Fig. 9 is a horizontal section on line X—X of Fig. 6;

Fig. 10 shows the front elevation of the reciprocating plate shifting frame;

Fig. 11 is a side elevation from the left hand side,

Fig. 12 is a rear elevation,

Fig. 13 is a side elevation from the right hand side,

Figure 16:
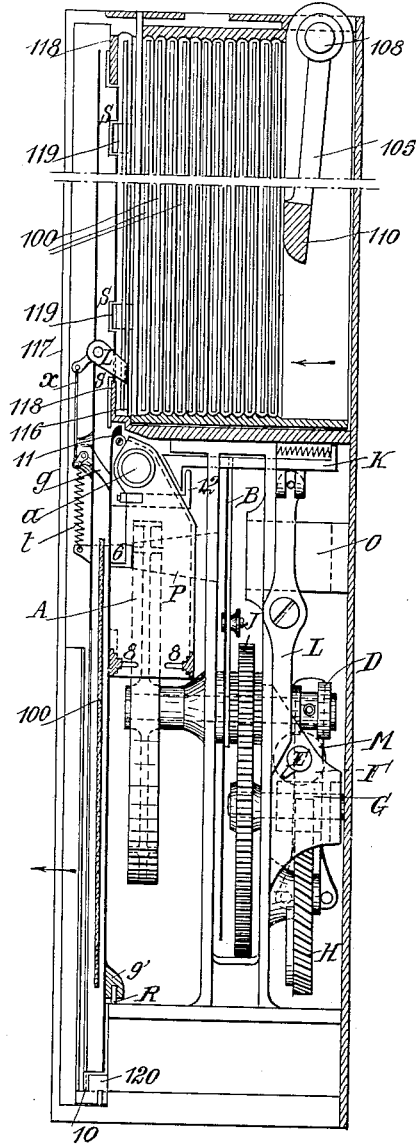
Figure 20:
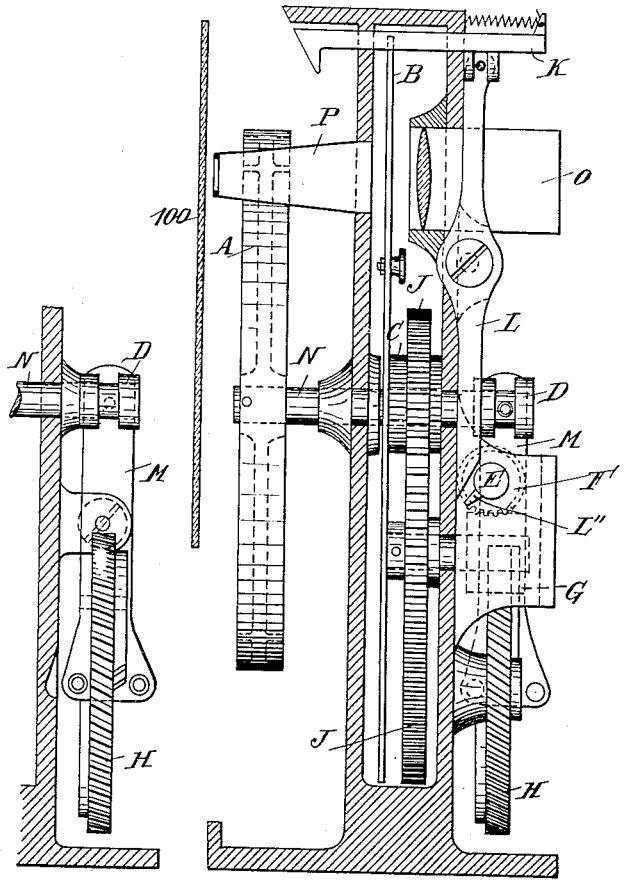
Figure 18:
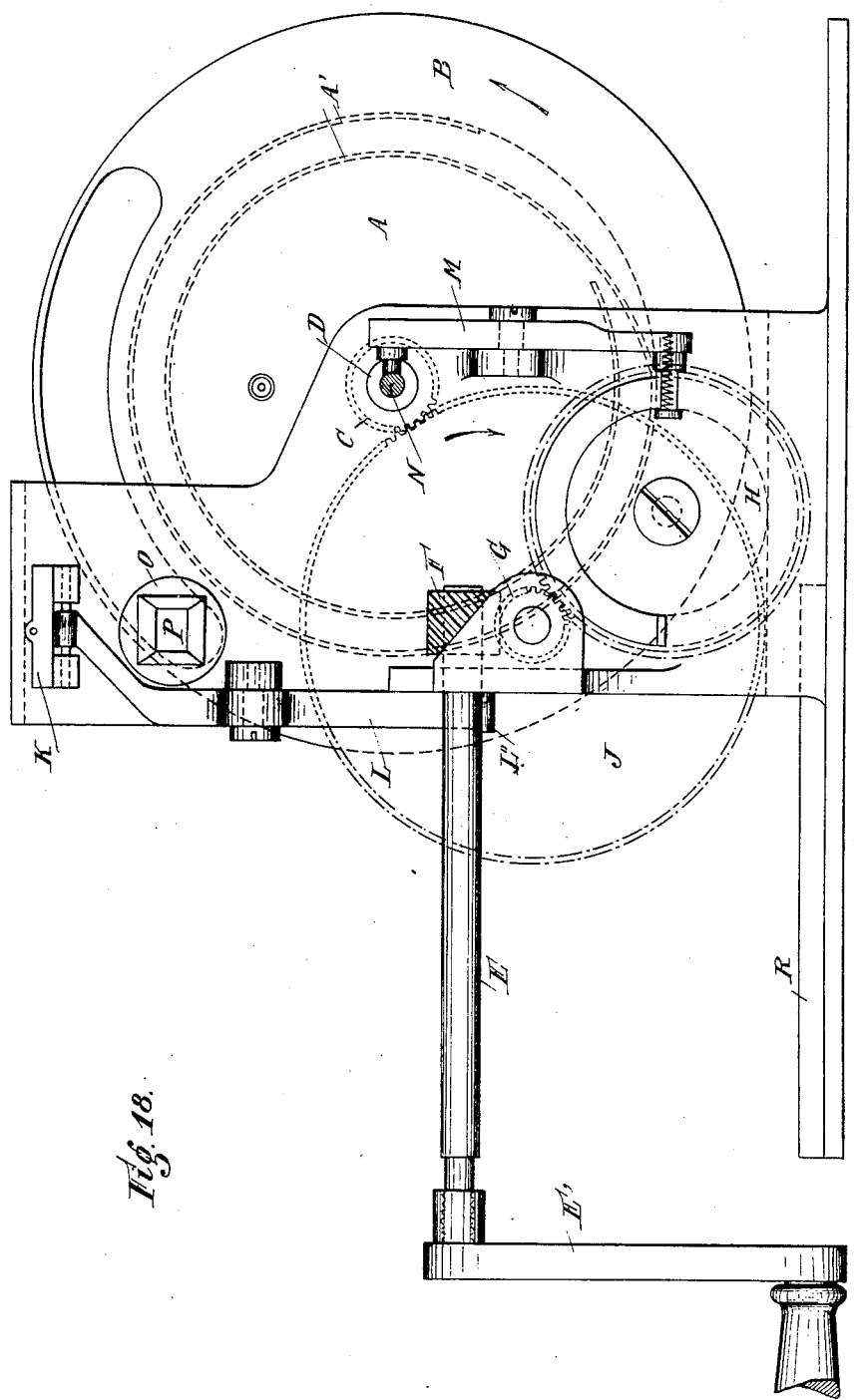

Fig. 14 the top plan view of said shifting frame;

Fig. 15 shows the front elevation of the inner mechanism of the apparatus;

Fig. 16 is a vertical cross section through the upper plate containing box and the entire apparatus;

Fig. 17 shows details of the shifting frame operating disk;

Fig. 18 is a front elevation of the complete shifting frame operating mechanism;

Fig. 19 is the top plan view of same,

Fig. 20 is the end elevation of same, and

Fig. 21 shows details of the objective shutter.

In my improved apparatus the pictures are made in horizontal and vertical series on ordinary photographic plates. The plate indicated by numeral 100 (Fig. 1) is inserted into a frame 101 made of any suitable material, the side-bars of which are provided on the front side with equidistant openings 102. The frame 101 has an inner guide-groove for the reception of the plate 100, which is locked in the frame by means of a resilient strip 103 bent inwardly.

The plates inserted into their frames 101 are placed into the plate containing box 104 (Fig. 4), in which they are pressed forwardly by a spring 105 (Fig. 3). The box 104 has on opposite sides sliding covers 106 provided with finger-pieces 107. The spring arrangement shown in Fig. 3 comprises a shaft 108 surrounded by a coil-spring 109 which acts to press the pressure lever 105 provided with a cushion 110 in the direction of the arrow 111, that is, toward the plates 100. The shaft 108 is geared by means of suitable toothed wheels or the like with a dial 112, whereby the forward movement corresponding to the number of the plates discharged from the box 104 will be shown by the dial 112, whose numerals are visible through a small opening 113. A locking button 114 enables the shaft 108 to be locked against rotation.

After the box 104 is filled with plates, it will be closed by means of the sliding doors 106. The sensitive plates are inserted into the boxes in a dark room, whereupon all other operations are effected in daylight. In order to enable the easy forward movement of the plates within the box, the bottom of the latter may be provided with projecting rails or ribs 115 (Fig. 2).

After the plate discharging and receiving boxes 104 and 104' are arranged in the positions shown in Figs. 4 and 5, the sliding doors 106 and 106' of said boxes will be opened, whereupon the plates are automatically moved from the upper box 104 into the lower box 104' in the manner hereinafter described by the operation of the crank. The plates contained in the box 104 are pushed by the pressure lever 105 into the discharge groove 116 provided inside the casing 117 (Figs. 6 to 9) and forming an extension of the box 104 placed into the apparatus. The discharge groove 116 is formed by strips or rails 118, enabling the plate to be only moved horizontally in its plane. The discharge groove cannot receive more than one plate at one time, and the space left free upon the discharge of one plate will be immediately occupied by the next plate.

The photographs or pictures representing the various steps of the movements of the movable objects to be reproduced, are made in succession upon the plate 100 on a zigzag line from the bottom to the top as shown in Fig. 1. In this view the various pictures of the plate are designated by the numerals 1, 2, 3, 4 . . . . To this end each plate is alternately moved horizontally and lowered, whereby the pictures are made on horizontal lines or rows and these horizontal rows are successively arranged one above the other. The horizontal movements of the plate are produced by means of a carrying frame the details of which are fully shown in Figs. 10 to 14. This carrying frame is guided on a central horizontal rod $a$ (Figs. 6, 7, 8, 15, 16) as well as on a lower rail R (Fig. 16) and has a vertical guide-groove 1 for the reception of the plate-frame 101 provided with a plate 100. On one side the carrying frame has a small arm 2, which when the frame is moved to the right, strikes against the left hand side of the frame 101 and moves the latter with it, whereby the frame 101 will be moved out from the groove 116 and toward the resilient guide-strips 119 (Figs. 6, 7, 9, 15, 16), which deflect the frame 101 and push the same into the guide-groove 1 of the carrying frame. Now the frame 101 will be lowered until its first opening 102 will be engaged by one of the catches 4 (Figs. 10 to 14). During the lowering of the frame 101, the latter causes an arm 3 to swing and act upon the arm 2 to prevent said arm 2 from striking against the next frame 101, until the guide-groove 1 of the carrying frame is left free for the reception of this next frame. The position of the arm 3 therefore controls or times the discharge of plates, so that all the plates are discharged in succession in the form of a continuous band, the first picture of the second plate following without jerk or interruption the last picture of the first plate.

The frame 101 being disengaged from the catch 4, said frame drops gently upon the bottom of the casing (on the right hand side) and upon moving the carrying frame to the left, the frame 101 strikes against the spring 120 (Figs. 6, 7, 8), which moves the frame 101 out from the carrying frame on the left hand side thereof. At the end of its stroke the frame 101 drops from the offset 121 (Figs. 6, 7, 8) which prevents the same from being moved backwardly with the carrying frame, which during its next movement to the right has its projection 10 sliding on the spring 120, whereby the frame 101 will be pushed toward the bottom of the casing on the right hand side, so that said frame 101 will be placed in parallel relationship to the longitudinal side of the casing, in which position it is ready to enter the receiving box 104' (Fig. 5). This is obtained when the next frame 101 is brought in the same manner between the first frame 101 and the carrying frame, the second frame 101 being then pushed by the latter against the first frame 101, whereby the first frame 101 will be moved into the box 104', the pressure-lever 105' (Fig. 5) of which yields only under the pressure of the spring 120 (Fig. 8), actuating at the same time the counting device of said box.

The device designed to actuate the carrying frame is constructed and operates as follows:—

Arranged on the carrying frame is a bracket provided with two racks 8, 8, between which is rotatably arranged a disk A acting as a fly-wheel (Fig. 17) and having on opposite sides two laterally projecting concentric flanges A', adapted to engage the teeth of the racks 8, the engagement taking place only on one side at one time. On each side the inner flange A' has a portion of its length cut away and is connected by an intermediate portion A'' with the outer flange to form a worm. The intermediate connecting portions A'' are arranged in opposite directions on both sides of the disk, so that if the latter is rotated and in engagement with one of the said racks 8, the latter will be alternately moved to the right or the left respectively and arrested.

In order to cause the two worms to alternately mesh with two racks 8, I arrange the shaft N so that it may be shifted longitudinally to a small extent. To this end the shaft N carries a gear-wheel C, by means of which motion is transmitted to said shaft. The gear-wheel C is not fast on the shaft M but feathered on the latter by means of a transverse pin, projecting into a recess of the gear-wheel C and enabling the shaft to be shifted longitudinally without changing the position of the gear-wheel. The shutter B (Figs. 18, 19, 20, 21) of the objective which hides the plate during its movement, is secured to the gear-wheel C. Upon each revolution of the latter the plate will be moved forwardly to the length of a picture and arrested again, the objective O being at the same time covered and uncovered respectively by the shutter B. As each rack has ten teeth, each stroke comprises ten displacements and ten stops, so that each horizontal row of pictures is formed of ten pictures. After a row of pictures is made, the disk A must be shifted laterally for reversing the movement and making the next row of pictures. This shifting is produced by means of a lever M (Figs. 15, 16, 18, 19, 20) actuated by the toothed wheel H provided with semi-circular lateral projections. The toothed wheel H makes one complete revolution when the gear-wheel C makes twenty revolutions, whereupon the lever M shifts the disk A by its action on the pulley D fast on the shaft N. Now the disk A makes ten revolutions in this position and so on.

Arranged on the shaft E actuated by means of the crank E' is a cam L'', which upon striking against the lever L pulls the spring actuated catch K forwardly. The rotation of the crank is transmitted by means of toothed wheels F, G to the toothed wheel H, and by means of a large toothed wheel J to the gear-wheel C. For each row of pictures the crank makes two revolutions, so that for each row of pictures the catch K is pulled twice; but as said catch can only act on the catches 4 (Figs. 10 to 14) if the extensions 12 of the latter are in front of the hooked ends of the catch K (Fig. 20) and as this occurs only once during each movement of the carrying frame in either direction, it will be seen that the catch K is alternately pulled idly and effectively, whereby the catches 4 will be actuated alternately by said catch K. If the catch K pulls the right hand catch 4 of the carrying frame (Figs. 10 to 14), the corresponding locking tooth 6 will be released and disengaged on this side from the corresponding opening of the frame 101; but as the locking tooth 6 on the opposite side of the carrying frame is still in its normal position, the plate can only be lowered to the length of this opening and will be arrested by the tooth 6 until the left hand locking catch is acted upon by the catch K. Then the latter disengages the left hand tooth 6 from the opening 102, the right hand opening being at the same time engaged by the right hand tooth 6 retained in its normal position. The same operation will be repeated for all openings 102 of the frame 101. After the last opening of a frame 101 is released, the next plate—which is inserted into the carrying frame at the moment the preceding plate has to make still two rows of pictures—will be locked at the first opening of its frame 101 and afterward lowered intermittently in the same manner as the preceding plate. In this manner a series of plates or several series of plates may be exposed to make pictures or simply moved through the apparatus to project pictures upon a screen without any appreciable interruption.

In summing up cinematographic pictures will be made and projected as follows:

The shutter B being properly adjusted and the discharge box 104 (Fig. 5) put in position, the sliding doors 106 will be opened and the crank E' rotated at a uniform speed. According as the various plates are covered with pictures as described, said plates are received into the lower box 104', the sliding doors 106' of which will be closed after the box is filled with plates, whereupon the box will be removed and replaced by an empty box. After the scene is completely photographed, all sliding doors will be closed and the last box removed from the apparatus. The pressure-lever device is then detached and removed from each box and replaced by a reservoir containing a developing and reducing bath serving to convert the negatives into positives. The plates being thus developed and fixed in their boxes, the latter may be placed successively at the top of the apparatus for the purpose of projecting the various pictures upon a screen by means of a source of light, which may be arranged within the apparatus if desired.

It is a very important feature of my invention that the plates need not be completely dry for the projection of the pictures, because the plates on their travel through the apparatus are not submitted to any frictional engagement. For this reason the plates cannot be injured by friction and may be used indefinitely. Furthermore as I use glass plates, any danger of fire inherent to the usual films will be avoided.

Having fully described my invention,

What I claim and desire to secure by Letters Patent is:—

1. In a cinematographic apparatus, the combination of a plate supply box; plate frames in said box; a reciprocating frame; a spring actuated lever adapted to push plate frames and plates from said box into said reciprocating frame; a counting device actuated by said lever; a lens; means for reciprocating the reciprocating frame in front of said lens; means for lowering said reciprocating frame after each complete reciprocation; a plate receiving box; and means for pushing plate frames from the lower part of the reciprocating frame into the plate receiving box.

2. In a cinematographic apparatus, the combination of plate frames therein and each having side bars with recesses therein; means for pushing the plate frame from the box; a lens; a reciprocating frame adapted to move step-by-step in front of the lens, and provided with vertical guide grooves; a small arm carried on the reciprocating frame and adapted to move the plate horizontally into said grooves; and escapement means engaging said recesses for lowering said plate frame an increment at the end of each reciprocation.

3. In a cinematographic apparatus, the combination of a lens; a reciprocating frame in front of the lens; means for feeding plates to said frame; a pair of racks on said frame; a wheel having worms adapted to engage one or the other of said racks and move the reciprocating frame step-by-step; a device operatively connected with said wheel for shifting the wheel from one rack to the other at the completion of movement in one direction; and means for operating said device and wheel.

4. In a cinematographic apparatus, the combination of a plate supply box provided with a horizontal groove; a plurality of plate frames in said groove; means for pushing plates toward said groove; a lens; a reciprocating frame in front of the lens and provided with vertical side grooves; means carried by the reciprocating frame for pushing the plate frames along said horizontal groove; resilient strips adapted to engage the plate frames and push them into said vertical grooves when moved by the reciprocating frame; a plate receiving box; and means for pushing the plate frames from the bottom of the reciprocating frame into the receiving box.

5. In a cinematographic apparatus, a plate box comprising side parts; a shaft mounted thereon; a removable lever carried thereon; a spring actuating said shaft and lever to cause the lever to push plates along in the box; a segmental gear secured to said shaft; and a dial engaging said gear for indicating the number of plates delivered from the box.

6. In a cinematographic apparatus, the combination of a plate supply box; plate frames therein each having side bars with recesses therein; a reciprocating frame; a spring adapted to push said plate frames from said box into the reciprocating frame; a counter secured to said frame; escapements engaging said recesses; racks secured to the reciprocating frame; a lens; a wheel having worms adapted to engage one or the other of said racks to move the reciprocating frame step-by-step in front of said lens; a device geared with said wheel to shift the same from one rack to the other; an operative connection between said device and the escapement to operate said escapement as said wheel is shifted; a plate receiving box; means for pushing plates from said reciprocating frame into said receiving box.

7. In a cinematographic apparatus, the combination of a plate supply box; a plurality of plate containing frames in said box and each having side bars with recesses therein; a lens; a reciprocating frame adapted to move in front of the lens; a spring adapted to push said plate frames from said box into the reciprocating frame; a counter secured to said spring; escapements engaging in the recesses of the plate frames for lowering the plates step-by-step; a pair of parallel racks secured to the reciprocating frame; a wheel having worms adapted to engage one or the other of said racks to reciprocate the frame step-by-step; a device geared with said wheel for shifting the same from one rack to the other on the completion of a determined number of turns of the wheel; a cam carried by said device; means operated by said cam for operating said escapements; a shutter operatively connected to said wheels; a means for rotating said shutter, wheel and device; a plate receiving box; and a spring for pushing the plates from the reciprocating frame into the receiving box.

In testimony whereof I affix my signature in presence of two witnesses.

EMILE M. STOFFELS.

Witnesses:
 HENRY J. COX,
 G. K. LERSCZ.